(12) United States Patent
Shoji et al.

(10) Patent No.: US 7,952,795 B2
(45) Date of Patent: May 31, 2011

(54) INFORMATION DISPLAY PANEL AND METHOD OF MANUFACTURING SAME

(75) Inventors: Takanori Shoji, Higashimurayama (JP); Shinichi Kita, Saitama (JP); Taichi Kobayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/810,559

(22) PCT Filed: Dec. 19, 2008

(86) PCT No.: PCT/JP2008/073210
§ 371 (c)(1),
(2), (4) Date: Jun. 25, 2010

(87) PCT Pub. No.: WO2009/081869
PCT Pub. Date: Jul. 2, 2009

(65) Prior Publication Data
US 2010/0265567 A1    Oct. 21, 2010

(30) Foreign Application Priority Data
Dec. 25, 2007 (JP) ................. 2007-331984

(51) Int. Cl.
*G02B 26/00* (2006.01)
(52) U.S. Cl. .................... 359/296; 345/107
(58) Field of Classification Search .............. 359/296; 345/107
See application file for complete search history.

(56) References Cited

U.S. PATENT DOCUMENTS

2001/0043291 A1* 11/2001 Kono et al. ............... 349/12
2007/0070031 A1   3/2007 Shoji et al.

FOREIGN PATENT DOCUMENTS

| JP | 2007-122026 A | 5/2007 |
| JP | 2007-219283 A | 8/2007 |
| WO | 03/050606 A1 | 6/2003 |

OTHER PUBLICATIONS

International Search Report dated Jan. 27, 2009 (with translation) (2 pages).

* cited by examiner

*Primary Examiner* — Ricky L Mack
*Assistant Examiner* — James C Jones
(74) *Attorney, Agent, or Firm* — Sughrue Mion, PLLC (57) ABSTRACT

There is provided an information display panel capable of maintaining a uniform gap between substrates and preventing migration. An undivided member for ensuring the gap is arranged as a pattern in a region where wiring electrodes are arranged, of a region between an information display region of the information display panel and a sealant forming portion provided in an outer edge portion of the information display panel and a plurality of divided members for ensuring a gap are arranged as a pattern in a region where the undivided member for ensuring a gap is not arranged, of the region between the information display region of the information display panel and the sealant forming portion provided in the outer edge portion of the information display panel.

7 Claims, 9 Drawing Sheets

(a) White color display (b) Black color display

INFORMATION DISPLAY PANEL AND METHOD OF MANUFACTURING SAME

TECHNICAL FIELD

The present invention relates to a dot matrix type information display panel and a method of manufacturing the information display panel, in which display media consisting of particles driven by an electric field are sealed between two substrates, at least one of which is transparent, for rewriting information display such as an image by electrically moving the display media by applying an electric field from electrodes provided in the substrates.

RELATED ART

As an information display device substitutable for a liquid crystal display (LCD), there are known information display devices adopting a method driving charged particles in a liquid (an electrophoretic method) or a method driving the charged particles in a gas (for example, an electronic liquid powder method).

As the information display panel used for the information display device of a method driving charged particles, there is known an information display panel, in which display media consisting of at least one kind of particles and having optical reflectance and charging property are sealed in a space between two opposed substrates, at least one of which is transparent, for displaying information such as an image by moving the display media by application of an electric field to the display media (for example, in WO2003/050606).

In the above-mentioned conventional information display panel, there is a sealant forming portion provided in the outermost edge portion of two substrates, for sealing a space between the substrates as a sealant. When two substrates are pressurized to be joined, the substrates in the information display region are not bent due to partition walls but the substrates in this sealant forming portion are bent so that a gap between the substrates may not be uniform.

In order to solve this problem, it is proposed that a large number of members for ensuring a gap are arranged as a small area pattern between this information display region (partition wall forming portion) and the sealant forming portion (for example, in JP2007-122026A).

DISCLOSURE OF THE INVENTION

Problems to be Solved by the Invention

Figure 9:
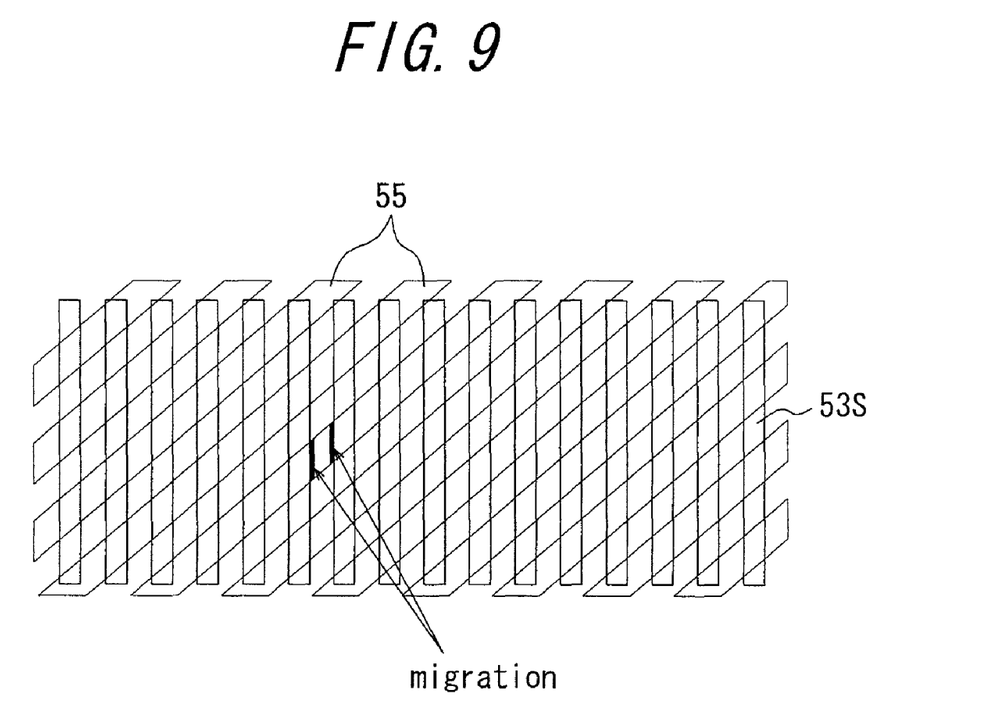
FIG. 9 is a view illustrating a problem of a conventional information display panel.

In the above-mentioned information display panel, when a large number of divided members for ensuring a gap (divided dummy ribs) 53S intersect with wiring electrodes 55 as shown in FIG. 9, there is a problem that migration (metal corrosion) occurs in this intersecting portion (portion shown in a bold line in the figure).

It is also proposed that a member for ensuring a gap is arranged on both sides of the sealant forming portion. However, in case that an undivided member for ensuring a gap is formed between the information display region and the sealant forming portion, a problem often happens that surplus particles are not sufficiently removed in a process of removing unnecessary surplus particles from display particles as display media.

It is, therefore, an object of the present invention to solve the above-mentioned problems and to provide an information display panel capable of maintaining a uniform gap between substrates and preventing migration.

Means for Solving the Problem

The present invention relates to a dot matrix type information display panel, in which display media consisting of particles driven by an electric field are sealed between two substrates, at least one of which is transparent, for rewriting information display such as an image by moving the display media by application of an electric field from electrodes provided in the substrates, wherein an undivided member for ensuring a gap is arranged as a pattern in a region where wiring electrodes are arranged, of a region between an information display region of the information display panel and a sealant forming portion provided in an outer edge portion of the information display panel and a plurality of divided members for ensuring a gap are arranged as a pattern in a region where the undivided member for ensuring a gap is not arranged, of the region between the information display region of the information display panel and the sealant forming portion provided in the outer edge portion of the information display panel.

In the information display panel according to the present invention, it is preferable that the undivided member for ensuring a gap is arranged only in a region where wiring electrodes provided on a back substrate are arranged.

In the information display panel according to the present invention, it is preferable that the undivided member for ensuring a gap and a partition wall pattern in the information display region are integrally formed.

In the information display panel according to the present invention, it is preferable that the undivided member for ensuring a gap, the plurality of divided members for ensuring a gap and a partition wall pattern in the information display region are made of a same material.

In the information display panel according to the present invention, it is preferable that the plurality of divided members for ensuring a gap are aligned in a same direction in a line.

In the information display panel according to the present invention, it is preferable that a line width of the plurality of divided members for ensuring a gap is within a range between 10 μm and 100 μm.

In the information display panel according to the present invention, it is preferable that a space between adjacent members of the plurality of divided members for ensuring a gap and a line width of the plurality of divided members for ensuring a gap are equal.

In a method of manufacturing the above-mentioned information display panel according to the present invention, a member for ensuring a gap and a partition wall pattern in the information display region are made of a same material and formed in a same process.

EFFECT OF THE INVENTION

According to the present invention, by arranging an undivided member for ensuring a gap as a pattern in a region where wiring electrodes are arranged, of a region between an information display region of the information display panel and a sealant forming portion provided in an outer edge portion of the information display panel and by arranging a plurality of divided members for ensuring a gap as a pattern in a region where the undivided member for ensuring a gap is not arranged, of the region between the information display region of the information display panel and the sealant forming portion provided in the outer edge portion of the information display panel, it is possible to provide an information display panel, in which a uniform gap between substrates is maintained and migration does not occur.

BEST MODE FOR CARRYING OUT THE INVENTION

First, it is explained about a basic structure of an information display panel according to the present invention. In the information display panel according to the present invention, an electric field is applied to a display medium having an optical reflectivity and an electric property and composed of at least one kind of particles sealed in a space between opposed two substrates. The charged display media are attracted along a direction of the electric field applied, by a force of the electric field, Coulomb force and the likes, and information display such as an image is performed by movements of the display media caused by change of the electric field. Therefore, it is necessary to design the information display panel such that the display media can move uniformly as well as maintaining stability during repetitive rewrite of display or continuous display. Here, forces applied to the particles constituting the display media may be an attraction force between the particles due to Coulomb force, an imaging force with respect to the electrodes or substrates, an intermolecular force, a liquid bonding force, gravity and the likes.

An example of the dot matrix type information display panel according to the present invention is described based on FIGS. 1 to 5.

In the example shown in FIGS. 1*a* and 1*b*, at least two kinds of display media 3 composed of particle groups including particles having optical reflectance and charge characteristic and each of the display media having different optical reflectance and charge characteristic (here, white color display media 3W comprised of a particle group of white color particles 3W*a* for white color display media and black color display media 3B comprised of a particle group of black color particles 3B*a* for black color display media) are moved in each cell formed by partition walls 4 in a perpendicular direction with respect to substrates 1, 2, in accordance with an electric field generated by application of voltage between an electrode (individual electrode) 5 provided to the substrate 1 and an electrode (individual electrode) 6 provided to the substrate 2. Then, a white color dot display is performed by having an observer view the white color display media 3W as shown in FIG. 1*a*, or a black color dot display is performed by having the observer view the black color display media 3B as shown in FIG. 1*b*. It is to be noted the partition walls at a front side are omitted in FIGS. 1*a* and 1*b*. The electrodes can be either provided outside the substrates or embedded inside the substrates. In this example, a cell sectioned by partition walls corresponds to a pair of opposed individual electrodes to constitute a unit for display (one dot).

In the example shown in FIGS. 2*a* and 2*b*, at least two kinds of display media 3 composed of particle groups including particles having optical reflectance and charge characteristic and each of the display media having different optical reflectance and charge characteristic (here, white color display media 3W comprised of a particle group of white color particles 3W*a* for white color display media and black color display media 3B comprised of a particle group of black color particles 3B*a* for black color display media) are moved in each cell formed by partition walls 4 in a perpendicular direction with respect to substrates 1, 2, in accordance with an electric field generated by application of a voltage between an electrode (line electrode) 5 provided to the substrate 1 and an electrode (line electrode) 6 provided to the substrate 2. Then, a white color dot display is performed by having an observer view the white color display media 3W as shown in FIG. 2*a*, or a black color dot display is performed by having the observer view the black color display media 3B as shown in FIG. 2*b*. It is to be noted the partition walls at a front side are omitted in FIGS. 2*a* and 2*b*. The electrodes can be either provided outside the substrates or embedded inside the substrates. In this example, a cell sectioned by partition walls corresponds to a pair of opposed line electrodes to constitute a unit for display (one dot).

In the example shown in FIGS. 3*a* and 3*b*, display media 3 (here, it indicates the white color display media 3W comprised of the particle group of the white color particle 3W*a* for the white color display media), composed of particle groups including particles having optical reflectance and charge characteristic are moved in each cell formed by the partition walls 4 in the direction parallel to the substrates 1, 2, in accordance with the electric field generated by application of voltage between the electrodes 5, 6 provided to the substrate 1. Then, white color dot display is performed by having the observer view the white color display media 3W as shown in FIG. 3*a*, or black color dot display is performed by having the observer view the color of a black board 7B as shown in FIG. 3*b*. It is to be noted that the partition walls at the front side are omitted in the example in FIGS. 3*a* and 3*b*. Here, the same display can be performed by having the black color display media instead of the white color display media 3W and a white color board instead of a black color board 7B. The electrodes can be either provided outside the substrate or embedded inside the substrate. In this example, a cell sectioned by partition walls constitutes a unit for display (one dot).

Figure 1:
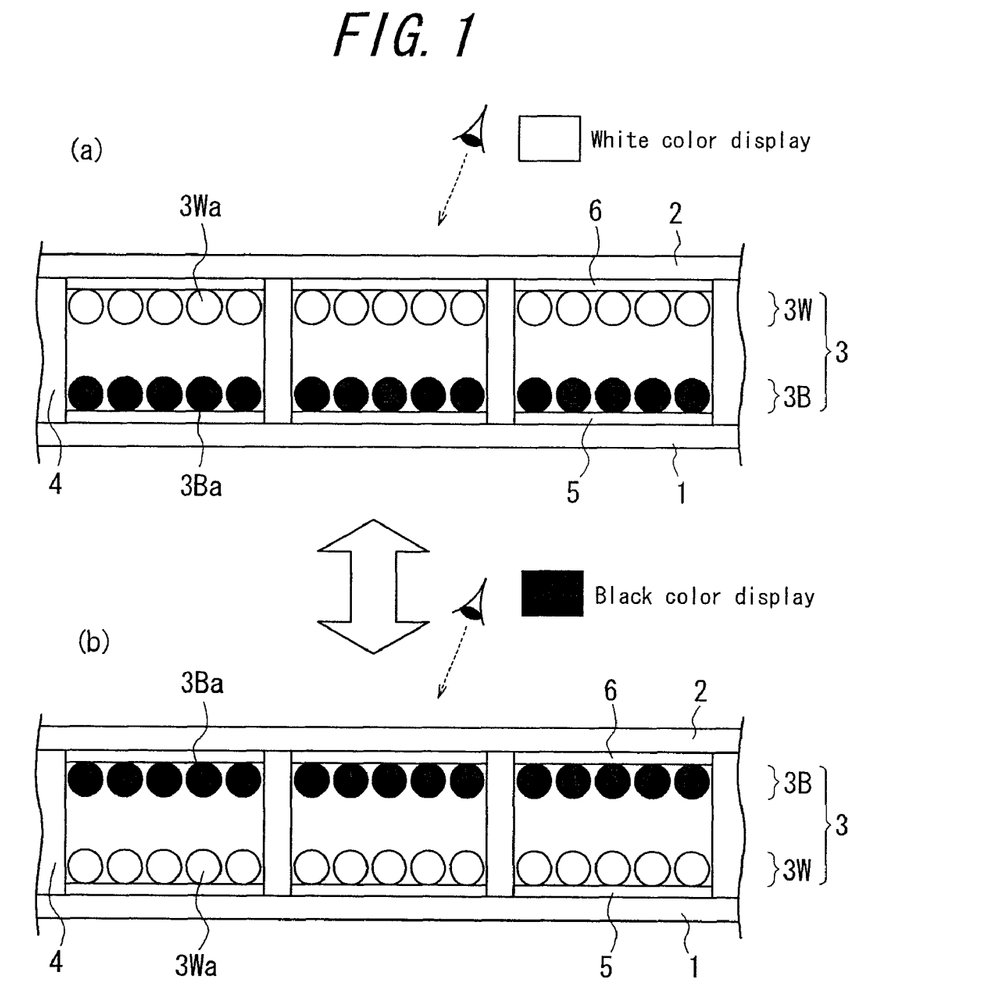
FIGS. 1*a* and 1*b* are views respectively illustrating an example of an information display panel according to the present invention.
Figure 2:
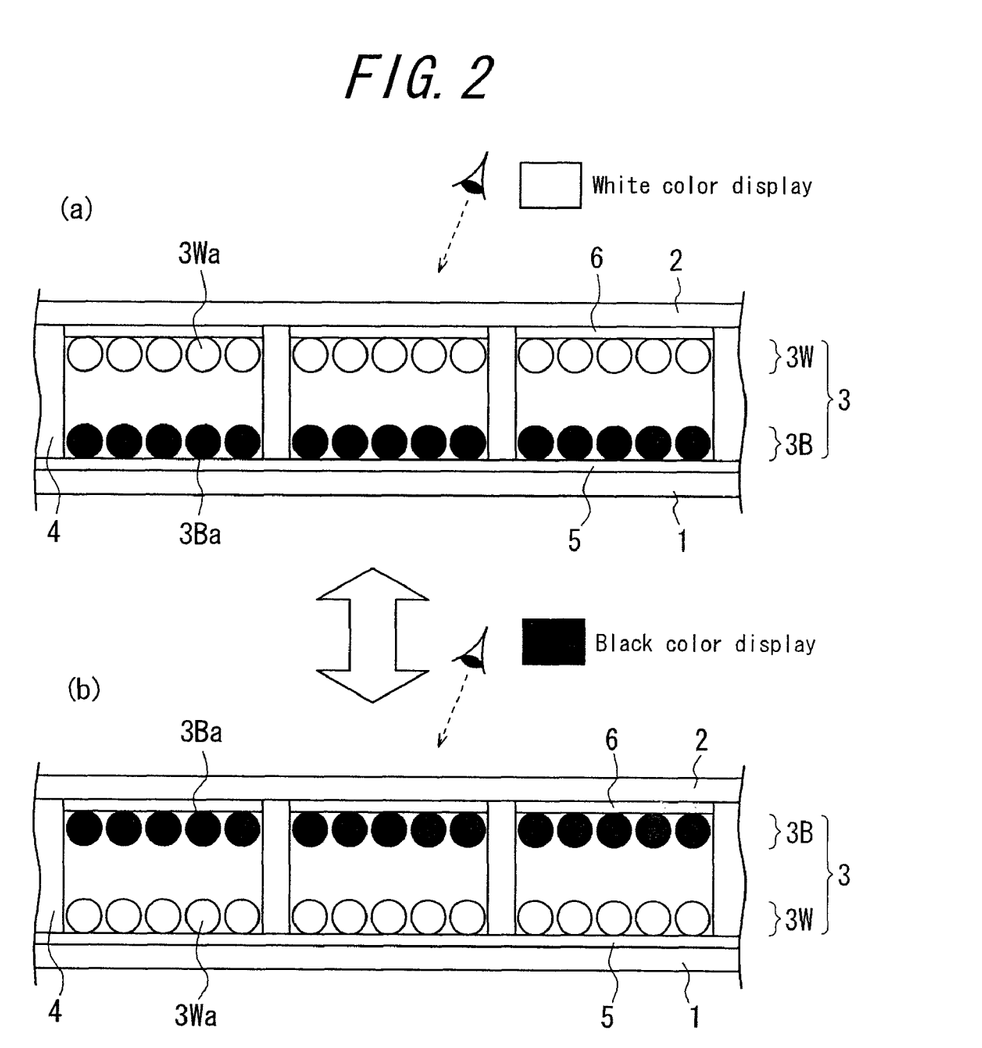
FIGS. 2*a* and 2*b* are views respectively illustrating another example of an information display panel according to the present invention.
Figure 3:
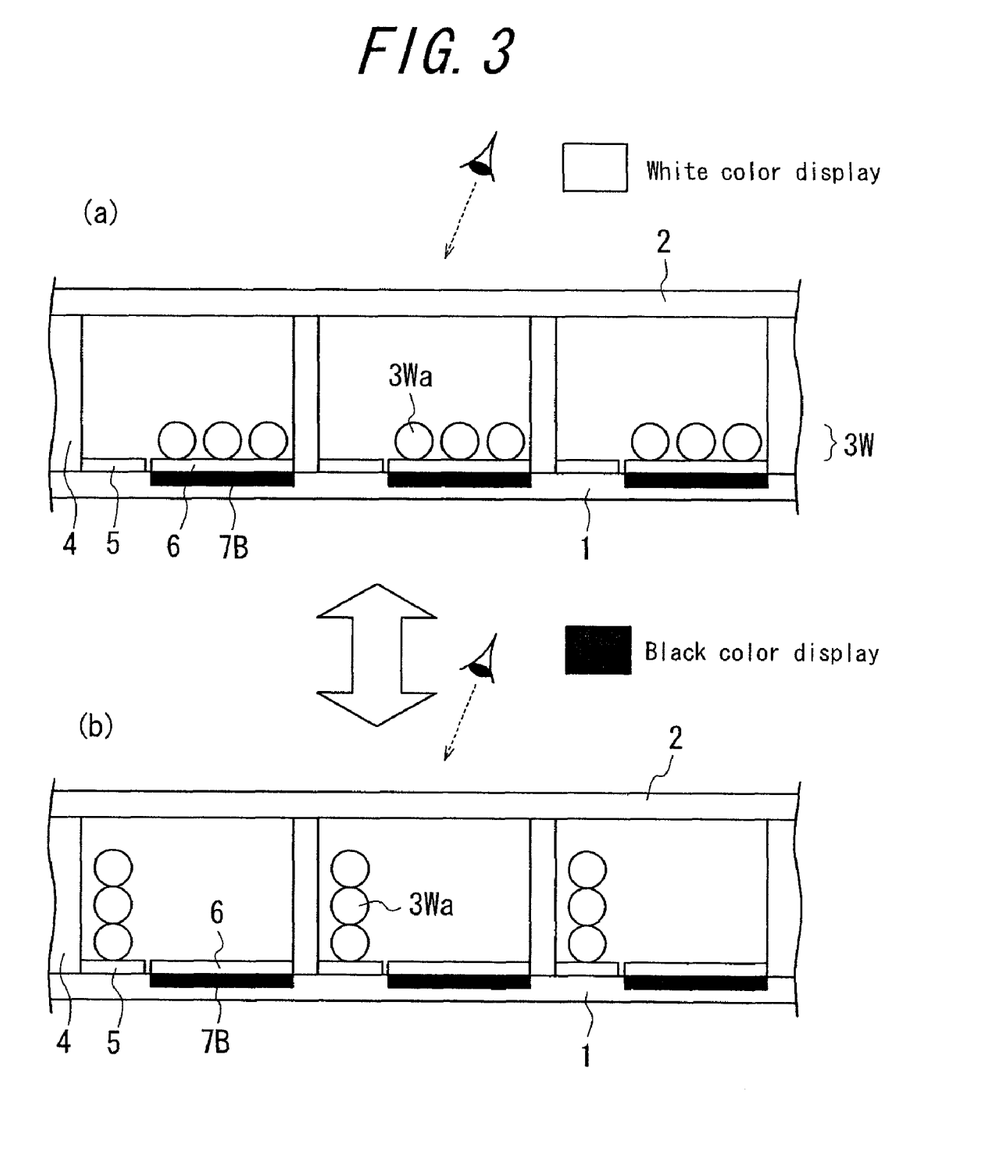
FIGS. 3*a* and 3*b* are views respectively illustrating another example of an information display panel according to the present invention.
Figure 4:
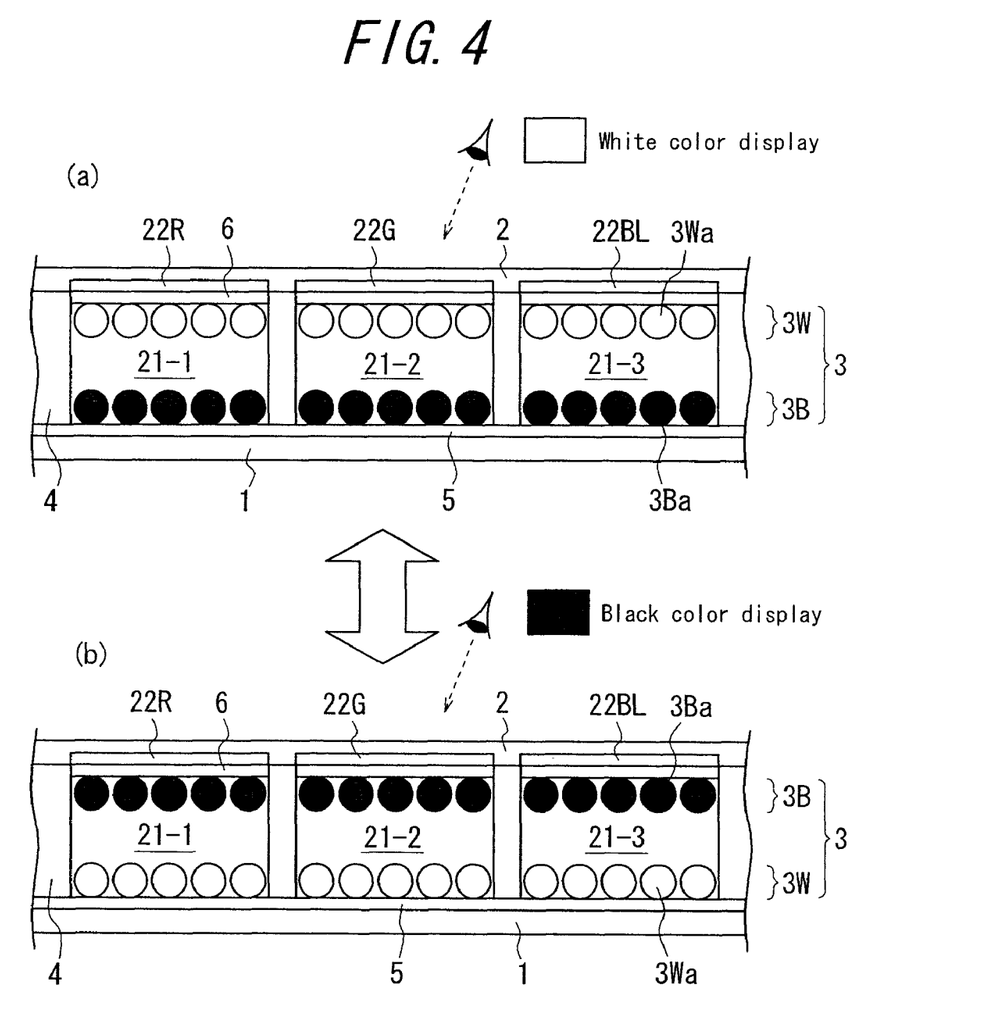
FIGS. 4*a* and 4*b* are views respectively illustrating another example of an information display panel according to the present invention.
Figure 5:
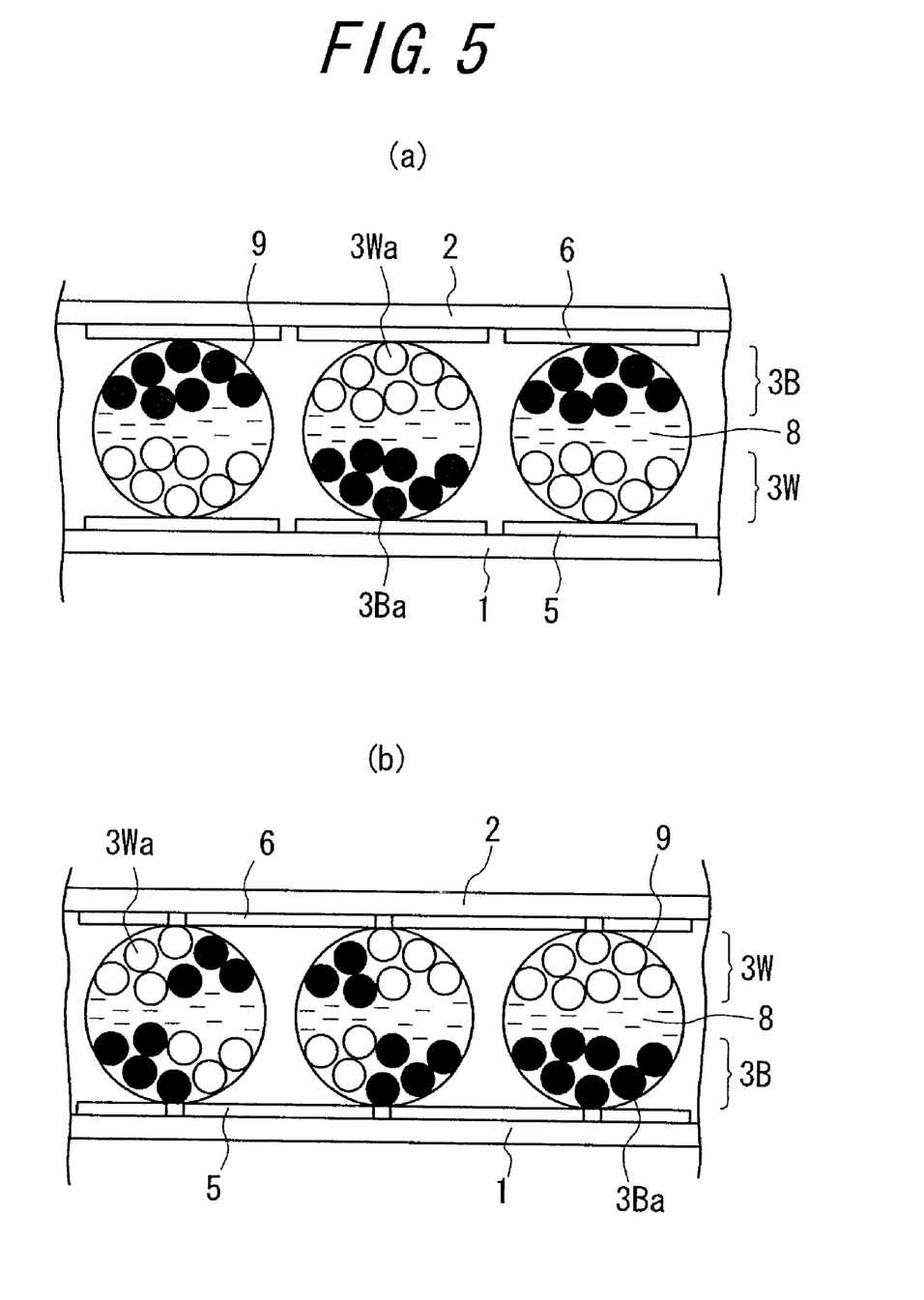
FIGS. 5*a* and 5*b* are views respectively illustrating another example of an information display panel according to the present invention.

FIGS. 4*a* and 4*b* show an example of a color dot display having basically the same constitution as the example shown in FIG. 1 and three cells which altogether constitute a unit for display (each cell is a single unit pixel and, in this case, a unit for display (one dot) is constituted of three-color unit pixels). In the example shown in FIGS. 4*a* and 4*b*, the white color display media 3W and the black color display media 3B as the display media are filled in all cells 21-1 to 21-3, and a red color filter 22R, a green color filter 22G and a blue color filter 22BL are provided to the first cell 21-1, the second sell 21-2, and the third cell 21-3, respectively, at the observer's side of the cells, so as to constitute a unit pixel by the first cell 21-1, the second cell 21-2 and the third cell 21-3. In this example, the white color dot display is performed for the observer by moving the white color display media 3W in all of the first cell 21-1 to the third cell 21-3 in one unit to the observer's side as shown in FIG. 4a, whereas the black color dot display is performed for the observer by moving the black color display media 3B in all of the first cell 21-1 to the third cell 21-3 in one unit to the observer's side as shown in FIG. 4b. A multi-color display can be performed depending on an arrangement of the display media in each of the cells. It is to be noted that the partition walls arranged at the front side are omitted in FIGS. 4a and 4b.

In an example shown in FIGS. 5a and 5b a microcapsule 9 filled with the white color particle 3Wa for the white color display media and the black color particles 3Ba for the black color display media together with an insulating liquid 8 is disposed in place of the above-mentioned cell sectioned by the partition walls 4. The difference between FIGS. 5a and 5b is that in an example shown in FIG. 5a individual electrodes 5, 6 are aligned with a microcapsule and constitutes a unit for display (one dot) with one microcapsule 9 while in an example shown in FIG. 5b individual electrodes 5, 6 are not aligned with a microcapsule and constitutes a unit for display (one dot). In case of a display panel of one side display, a substrate and an electrode disposed at the opposite to an observer's side may not be transparent.

Figure 6:
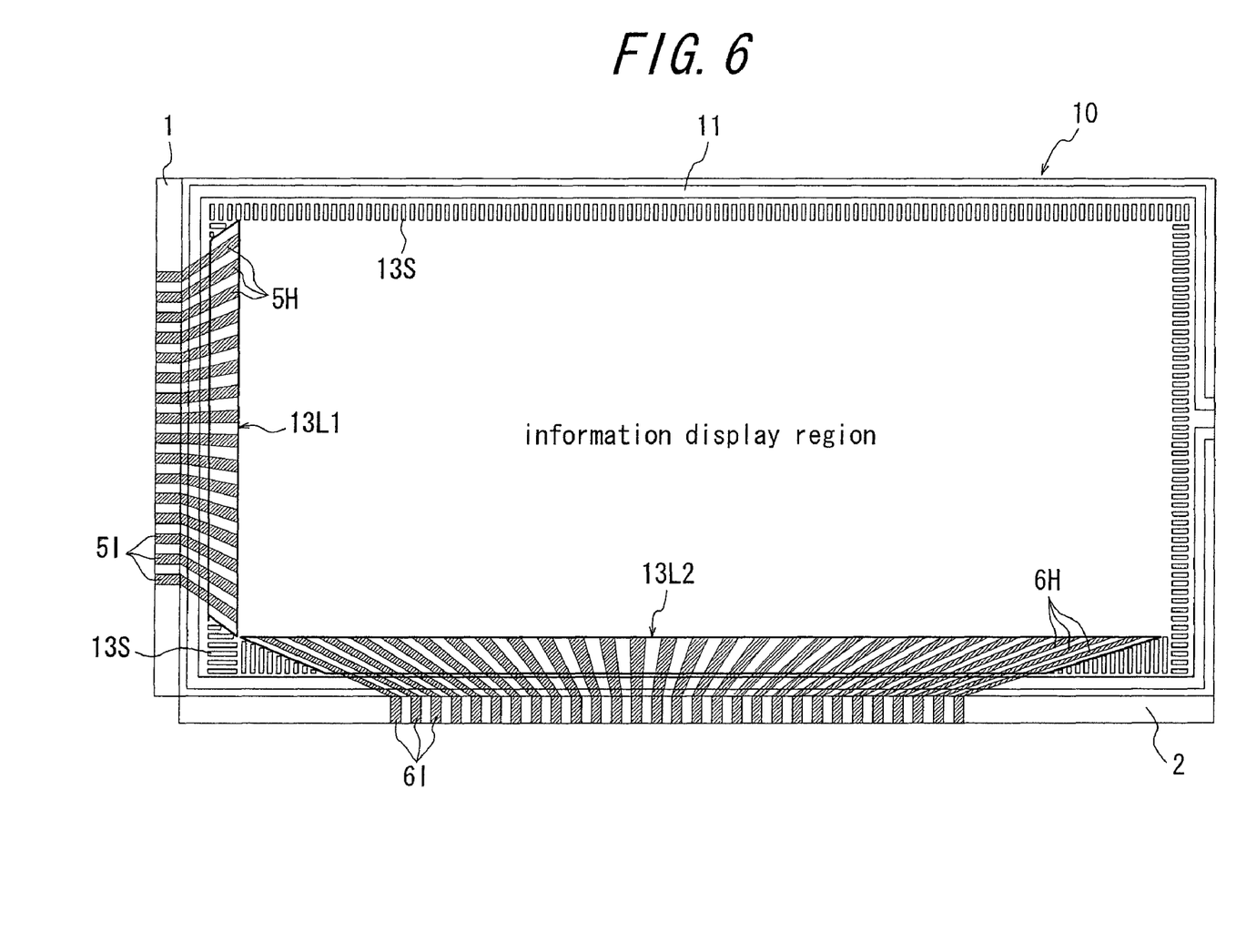
FIG. 6 is a view illustrating an example of an information display panel according to the present invention.

FIG. 6 shows an example of the information display panel of the present invention.

In FIG. 6, input electrodes SI and wiring electrodes 5H are arranged in the left side of a back substrate 1 of an information display panel 10 and input electrodes 6I and wiring electrodes 6H are arranged in the bottom side of a transparent front substrate 2. A sealant forming portion 11 for sealing a space between the both substrates as a sealant is arranged in the outer edge portion of the information display panel 10. In order to prevent the substrates from being bent and to keep a uniform gap between the substrates when the both substrates are pressurized to be joined, a member for ensuring a gap (dummy rib) is arranged between the sealant forming portion 11 and the information display region (partition wall forming portion).

In FIG. 6, an undivided member for ensuring a gap (undivided dummy rib) 13L1 is arranged in a region where the wiring electrodes 5H in the left side of the information display panel 10 and an undivided member for ensuring a gap (undivided dummy rib) 13L2 is arranged in a region where the wiring electrodes 6H in the bottom side of the information display panel 10. In addition, a large number of divided members for ensuring a gap (divided dummy ribs) 13S are arranged in a region where the wiring electrodes 5H, 6H are not arranged.

By such arrangement of members for ensuring a gap, it is possible to prevent migration (metal corrosion) in a region where the wiring electrodes 5H, 6H are arranged.

Following three elements namely (1) electric field (2) ion component (3) water are required for migration.

In the information display panel of the present invention, an electric field is formed between a pair of electrodes by voltage applied to the pair of electrodes at the time of driving. Adhesive is applied on a member for ensuring a gap formed on one substrate for adhering to the other substrate. This adhesive includes an ion component. Since these two elements are essential for the constitution of the information display panel, the inventors studied removal of water, which is the third element. As a result, the inventors found that, when a large number of divided members for ensuring a gap intersect with wiring electrodes, drying-out of this intersecting portion is insufficient so that water remains in this intersecting portion. Therefore, by arranging an undivided member for ensuring a gap in a region where wiring electrodes are arranged, migration is prevented.

In the information display panel of the present invention, it is preferable that the undivided member for ensuring a gap is arranged only in a region where wiring electrodes provided on a back substrate are arranged.

In other words, the undivided member for ensuring a gap (undivided dummy rib) 13L1 is arranged in a region where the wiring electrodes 5H on the substrate 1 are arranged in the left of FIG. 6 and a large number of divided members for ensuring a gap (divided dummy ribs) 13S are arranged in other regions, that is, regions where the wiring electrodes 6H on the transparent front substrate 2 are arranged in the bottom of FIG. 6 and where the wiring electrodes 5H, 6H are not arranged.

It is because an ion component which is a major cause of migration does not exist in this portion that the undivided member for ensuring a gap (undivided dummy rib) is not arranged on the wiring electrodes on the transparent front substrate. In other words, it is because an ion component which is a major cause of migration is included in adhesive used for attaching two substrates, and this adhesive exists only between the back substrate and the member for ensuring a gap.

In order to prevent insufficient removal in a process of removing surplus particles, a region where the undivided member for ensuring a gap (undivided dummy rib) is arranged should be as small as possible.

Figure 7:
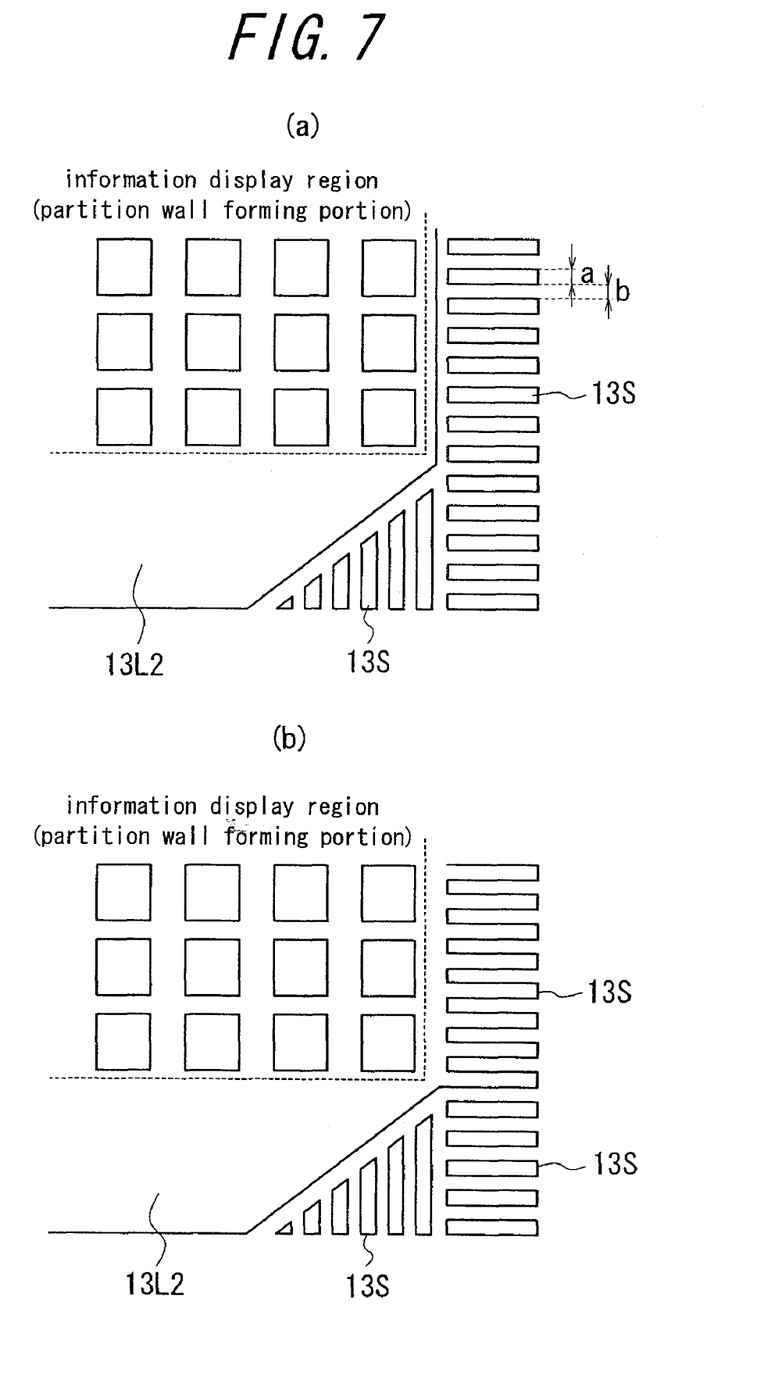
FIGS. 7*a* and 7*b* are views respectively illustrating another example of an information display panel according to the present invention.

It is preferable for the information display panel of the present invention that, as shown in FIG. 7a the undivided member for ensuring a gap (undivided dummy rib) 13L2 and a partition wall pattern in the information display region are formed in an integral and continuous shape. Although, in FIG. 7, the undivided member for ensuring a gap (undivided dummy rib) 13L2 in a region where the wiring electrodes of the transparent front substrate are arranged is explained as an example, the undivided member for ensuring a gap (undivided dummy rib) in a region where the wiring electrodes of the back substrate are arranged is similar.

In case that there is a small area where the wiring electrodes are not covered with the dummy rib, migration will occur in the area. Therefore, the dummy rib is continuously formed. It is more preferable that the undivided member for ensuring a gap (undivided dummy rib) and the partition wall pattern in the information display region are made of the same material in the same process. However, they may be made of different materials in different processes.

As an example of making partition walls and a member for ensuring a gap of the same material in the same process, there is a method of exposing a photosensitive resist film attached to a predetermined region to light by using a predetermined exposure mask. As this time, by reflecting both patterns of partition walls and a member for ensuring a gap to an exposure mask, it is possible to make them of the same material in the same process A large number of divided members for ensuring a gap (divided dummy ribs) 13S may not be continuous with partition walls and undivided members for ensuring a gap (undivided dummy rib) or may be partially continuous with them as shown in FIG. 7b.

In addition, the large number of divided members for ensuring a gap (divided dummy ribs) are preferably aligned in the same direction in a line but may have other shape.

In case that the large number of divided members for ensuring a gap are aligned in a line, it is preferable that the line width a and the space width b (illustrated in FIG. 7a) are within the range between 10 μm and 100 μm. In case that the widths are smaller than this range, efficiency of removing surplus particles may deteriorate. On the other hand, they are larger than this range, effect of ensuring a gap may deteriorate. In addition, it is preferable that the line width a and the space width b are equal, that is, a=b. The reason is that the balance of the effect of ensuring a gap due to the line width and the effect of removing surplus particles due to the space width needs to be kept adequately.

The information display panel of the present invention was produced and evaluated for its performance to find that no migration defect occurred in the intersecting portion of a large number of divided members for ensuring a gap and the wiring electrodes although conventionally migration defect used to occur at the rate of small percent.

The following is an explanation of each member constituting the information display panel according to the present invention.

As for the substrates, at least one of the substrates (display side substrate) is a transparent substrate such that a color of the display media can be observed from outside of the information display panel, and preferably made of a material having a high transmission factor of visible light and an excellent heat resistance. A back side substrate may be either transparent or opaque. The substrate is, for example, a plastic-based substrate made from polyethylene terephthalate (PET), polyethylene naphthalate (PEN), polyether sulfone (PES), polyethylene (PE), polycarbonate (PC), polyimide (PE) or acryl, or a glass-based substrate. A thickness of the substrate is preferably 2 μm to 5000 μm, more preferably 5 μm to 2000 μm. It becomes difficult for the substrate to maintain strength and distance uniformity between the substrates when it is too thin, while the substrate is inexpedient to be used for a slim information display panel when it is thicker than 5000 μm.

As materials for the electrode provided to the information display panel, it is suitably selected from, for example, metals such as aluminum, silver, nickel, copper, gold and the likes, conductive metal oxides such as indium tin oxide (ITO), zinc-toped indium tin oxide (IZO), Al-doped zinc oxide (AZO), indium oxide, conductive tin oxide, antimony tin oxide (ATO), conductive zinc oxide and the likes, or conductive polymers such as polyaniline, polypyrrole, polythiophene and the likes. As a method to form the electrode, it adopts a method to form a thin film from the above materials by a sputtering method, a vacuum vapor deposition method, CVD (chemical vapor deposition) method, a coating method and the likes, or a method to laminate a metallic foil (for example, the rolled copper foil), a method to mix conductive agents with solvents or synthetic resin binder and spray the mixture thereof. Although the electrode to be provided to the substrate 2 at the display side, which is disposed at the viewer's side and needs to be transparent, are required to be transparent as well, the electrode provided to the substrate 1 at the back side are not required to be transparent. In both cases, the above materials which are conductive and have a pattern formation capability can be suitably used. Additionally, thicknesses of the electrode may be suitable as long as maintaining electro-conductivity and uninterrupted transparency, which is preferably between 0.01 μm to 10 μm, more preferably 0.05 μm to 5 μm. Although the material and the thickness of the electrode provided to the substrate 1 at the back side are the same as those provided to the substrate at the display side, it is not required to be transparent. It is to be noted that an external voltage input in this case may be either a direct current or overlapped alternate currents.

Figure 8:
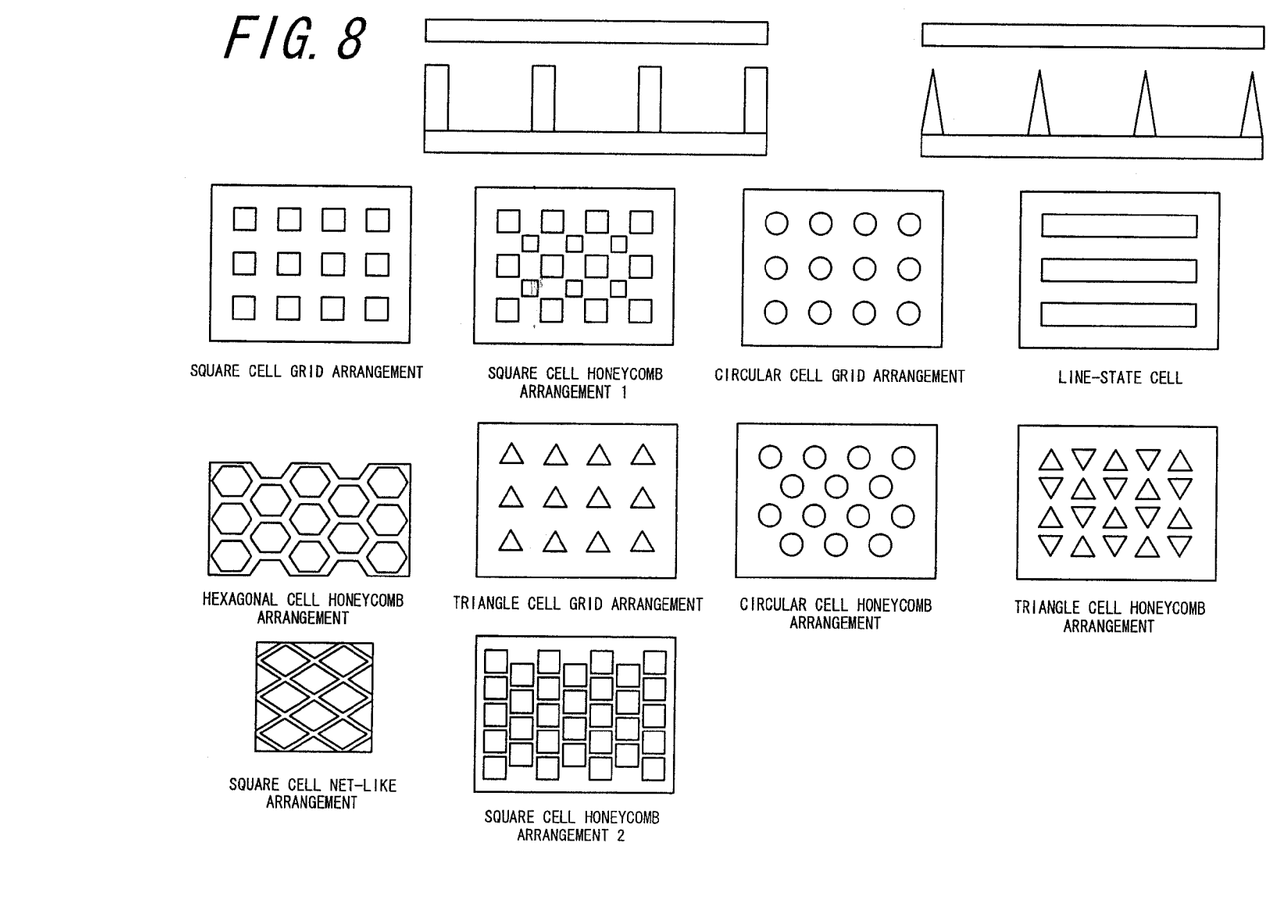
FIG. 8 is a view showing examples of forms of partition walls of the information display panel according to the present invention.

A height and a width of the partition walls for forming a cell in a space between the substrates of the information display panel are optimally determined in accordance with a kind of the display media for displaying and not uniformly limited. However, the width of the partition walls is adjusted to be 2 μm-100 μm and preferably 3 μm-50 μm, and the height of the partition walls is adjusted to 10 μm-500 μm, preferably 10 μm-200 μm, more preferably 10 μm-100 μm and particularly preferably 10 μm-50 μm. The height of the partition walls may be adjusted to a gap between substrates (an interval between substrates) or may be partially lower than a gap between substrates. Although a shape of the cell of the information display panel obtained by overlapping the substrate at the display side and the substrate at the back side is exemplified by polygonal such as square, triangle, line-state, circle, hexagonal and so on viewed from a plane surface of the substrate as shown in FIG. 8, it may also be a circle, oval, racetrack geometry, or a combination of different shapes. Among the above, preferred shapes are the polygonal with rounded corners (especially square with rounded corners), circle, oval, racetrack geometry, as they facilitates movements of the display media. An arrangement of the cells is exemplified by a grid pattern, a honeycomb patter and a net-like pattern, for example. A variety of patterns are used in accordance with the shape of the cells. Among the above, it is preferred to arrange the cell in the shape of square with rounded corners in the grid pattern, and to minimize a part of a cross-sectional part of the partition walls observable from the display side (dimension of a frame of the cell formed of the width of the partition wall) for improvement of sharpness of the display.

Here, a method of forming the partition wall is exemplified by a die transfer method, a screen-printing method, a sand-blast method, a photolithography method or an additive method. Each of the methods may be preferably used, although the photolithography method using a resist film and the die transfer method are used more preferably.

In the present invention, a method is preferably used, in which the above-mentioned partition walls, undivided member for ensuring a gap and divided members for ensuring a gap are made of the same material and formed in the same process.

Next, it will be explained about the display particles composed of particle groups as display media (hereinafter, also referred to as particles) according to the present invention. The display particles themselves or the display particles combined with other particles are used as the display media.

In the particle, a resin as a main component may contain charge control agents, coloring agent, inorganic additives and so on as conventionally performed, if necessary. The followings are examples of resin, charge control agent, coloring agent and other additives.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent.

The display particles having a desired color can be produced by mixing the coloring agents mentioned above.

Moreover, it is preferred that the display particles of the present invention are evenly shaped having the average particle diameter d(0.5) in a range of 1 μm-20 μm. The image clearness is deteriorated if the average particle diameter d(0.5) is greater than this range, whereas an agglutination force between the particles becomes so large that it interferes with movements of the display media if the average particle diameter is smaller than this range.

Moreover, as to a particle diameter distribution of each particle of the display particles according to the present invention, Span of the particle diameter distribution defined by the following formula is less than 5, preferably less than 3.

$$\text{Span} = (d(0.9) - d(0.1))/d(0.5)$$

(here, d(0.5) means a value of the particle diameter expressed by μm wherein an amount of the particles having the particle diameter larger than or smaller than this value is 50%, d(0.1) means a value of the particle diameter expressed by μm wherein an amount of the particles having the particle diameter smaller than this value is 10%, and d(0.9) means a value of the particle diameter expressed by μm wherein an amount of the particles having the particle diameter smaller than this value is 90%).

When the Span is set to under 5, the particle diameter becomes even, which enables even movements of the particles.

Furthermore, it is important that a ratio of d(0.5) of the particle having the smallest diameter in the used display particles with respect to d(0.5) of the particle having the largest diameter is set to not more than 10. The particles having different charge characteristics move reversely even if the particle diameter distribution Span is made smaller. Therefore, this is a preferred range where each particle has approximately the same size and can easily move in opposite directions.

It is to be noted that, the particle diameter distribution and the particle diameter of the display particle can be measured by means of a laser diffraction/scattering method. When a laser light is emitted at the particles to be measured, a light intensity distribution pattern due to a diffraction/scattering light occurs spatially. Since this light intensity distribution pattern corresponds to the particle diameter, it is possible to measure the particle diameter and the particle diameter distribution.

The particle diameter and the particle diameter distribution according to the present invention are obtained by a volume standard distribution. In particular, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Although a charged level of the display particles obviously depends on a measuring condition, it was found that the charge level of the display particles of the information display panel mostly depends on a primary charged level, charge decay accompanying contact with the partition walls and substrates and an elapsed time, and that especially a saturation value of a charging action of the display particles is a control element.

As a result of an earnest investigation by inventors of the present invention, it was found that it is possible to evaluate an adequate range of charging property of the display particles by a charging level measurement of the display particles by use of the same carrier particles in a blow-off method.

Furthermore, in a case of using a dry-type information display panel, driving the display media in the gap filled with a gas, as the information display panel, it is important to control the gas in the space surrounding the display media, as it contributes to an improvement of display stability. In particular, it is important to control a relative humidity of the gas in the gap to 60% RH or less at 25° C., preferably 50% RH or less.

The above gap is the gas surrounding the display media, which is a part between the substrates 1 and 2 opposed to one another except for the electrodes 5, 6 (in a case where the electrodes are provided inside of the substrates), an occupied section by the display media 3, an occupied section by the partition walls 4 and a seal section of the information display panel in FIG. 1a.

A kind of the gas in the gap is not limited as long as its humidity is within the above range, although preferably used are dry air, dry nitrogen gas, dry argon gas, dry helium gas, dry carbon dioxide gas, dry methane gas and the likes. It is necessary for the gas to be sealed in the information display panel so as to be able to maintain its humidity. For example, it is essential to fill the particles composing the display media and to assemble the information display panel in an atmosphere with a predetermined humidity and, moreover, to apply a seal agent and a sealing method for preventing a humidity invasion from outside of the device.

Although the space between the substrates of the information display panel according to the present invention is not strictly limited as long as it enables the display media to move and it can maintain contrast, it is normally adjusted to 10 μm-500 μm, preferably 10 μm-200 μm, more preferably 10 μm-100 μm and particularly preferably 10 μm-50 μm.

A volume-occupancy of the display media in the gas in the gap between the substrates opposed one another is preferably 5-7%, more preferably 5-60%. It interferes with movement of the display media when the volume-occupancy is over 70%, while the contrast becomes unclear when the volume-occupancy is less than 5%.

INDUSTRIAL APPLICABILITY

The information display panel according to the present invention is preferably applicable to the display unit for mobile equipment such as notebook personal computers, electric diary, PDAs (Personal Digital Assistants), cellular phones, handy terminals and so on; the electric paper such as electric books, electric newspapers, electric manual (instruction) and so on; the bulletin boards such as signboards, posters, blackboards (whiteboards), and so on; the image display unit for electric calculator, home electric application products, auto supplies and so on; the card display unit such as point cards, IC cards and so on; and the display unit for electric advertisements, information boards, electric POPs (Point Of Presence, Point Of Purchase advertising), electric price tags, electric shelf tags, electric musical score, RF-ID device and so on, the display unit for electric equipments such as POS terminals, car navigation system, clock and so on, and also preferably used as a rewritable paper which is equipped in a rewritable device to rewrite display.

It is to be noted that a driving method of the information display panel according to the present invention may apply a variety of types of the driving methods such as a simple matrix driving method and a static driving method that do not use a switching element for the panel itself, an active matrix driving method using a three-terminal switching element represented by a thin-film transistor (TFT) or a two-terminal switching element represented by a thin-film diode (TFD), and the likes.

The invention claimed is:

1. A dot matrix type information display panel, in which display media consisting of particles driven by an electric field are sealed between two substrates, at least one of which is transparent, for rewriting information display such as an image by moving the display media by application of an electric field from electrodes provided in the substrates, wherein
an undivided member for ensuring a gap is arranged as a pattern in a region where wiring electrodes are arranged, of a region between an information display region of the information display panel and a sealant forming portion provided in an outer edge portion of the information display panel and
a plurality of divided members for ensuring a gap are arranged as a pattern in a region where the undivided member for ensuring a gap is not arranged, of the region between the information display region of the information display panel and the sealant forming portion provided in the outer edge portion of the information display panel, and
wherein the undivided member for ensuring a gap, the plurality of divided members for ensuring a gap and a partition wall pattern in the information display region are made of a same material.

2. The information display panel according to claim 1, wherein the undivided member for ensuring a gap is arranged only in a region where wiring electrodes provided on a back substrate are arranged.

3. The information display panel according to claim 1, wherein the undivided member for ensuring a gap and a partition wall pattern in the information display region are integrally formed.

4. The information display panel according to claim 1, wherein the plurality of divided members for ensuring a gap are aligned in a same direction in a line.

5. The information display panel according to claim 4, wherein a line width of the plurality of divided members for ensuring a gap is within a range between 10 and 100 μm.

6. The information display panel according to claim 4, wherein a space between adjacent members of the plurality of divided members for ensuring a gap and a line width of the plurality of divided members for ensuring a gap are equal.

7. A method of manufacturing the information display panel according to claim 1, wherein the undivided member for ensuring a gap and the partition wall pattern in the information display region are formed in a same process.

* * * * *